US011184282B1

(12) United States Patent
Kheradmand et al.

(10) Patent No.: US 11,184,282 B1
(45) Date of Patent: Nov. 23, 2021

(54) PACKET FORWARDING IN A NETWORK DEVICE

(71) Applicant: VMware, Inc., Palo Alto, CA (US)

(72) Inventors: Ali Kheradmand, Urbana, IL (US); Santhosh Prabhu Muraleedhara Prabhu, Urbana, IL (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/852,309

(22) Filed: Apr. 17, 2020

(51) Int. Cl.
| | | |
|---|---|---|
| H04L 12/28 | (2006.01) | |
| H04L 29/06 | (2006.01) | |
| H04L 12/741 | (2013.01) | |
| H04L 12/801 | (2013.01) | |
| H04L 12/861 | (2013.01) | |
| H04L 12/947 | (2013.01) | |

(52) U.S. Cl.
CPC ............ *H04L 45/74* (2013.01); *H04L 47/10* (2013.01); *H04L 49/252* (2013.01); *H04L 49/90* (2013.01)

(58) Field of Classification Search
CPC .......... H04L 45/74; H04L 47/10; H04L 49/90
See application file for complete search history.

(56) References Cited

U.S. PATENT DOCUMENTS

| | | | | |
|---|---|---|---|---|
| 7,054,315 B2 * | 5/2006 | Liao | ........................ | H04L 29/06 370/351 |
| 7,116,663 B2 * | 10/2006 | Liao | ........................ | H04L 45/00 370/392 |
| 9,100,319 B2 * | 8/2015 | Guo | ........................ | G06F 21/564 |
| 9,225,601 B2 | 12/2015 | Khurshid et al. | | |
| 9,491,143 B2 * | 11/2016 | Guo | ........................ | G06F 21/564 |
| 9,680,738 B2 * | 6/2017 | Jackson | .................. | H04L 45/54 |
| 9,756,081 B2 * | 9/2017 | Guo | ........................ | G06F 21/56 |
| 10,361,918 B2 * | 7/2019 | Voellmy | .................. | H04L 45/74 |
| 10,778,545 B2 * | 9/2020 | Sun | ........................ | H04L 43/06 |
| 2015/0078384 A1 * | 3/2015 | Jackson | .................. | H04L 45/38 370/392 |
| 2015/0078386 A1 * | 3/2015 | Jackson | .................. | H04L 69/22 370/392 |

(Continued)

OTHER PUBLICATIONS

Khurshid et al. "VeriFlow: Verifying Network-Wide Invariants in Real Time", 10th USENIX Symposium on Networked Systems Design and Implementation (NSDI '13), 2013, pp. 1-13.

(Continued)

*Primary Examiner* — Alpus Hsu
(74) *Attorney, Agent, or Firm* — Kim & Stewart LLP

(57) ABSTRACT

An example method of packet forwarding for a packet set in a network device includes: selecting a first bit pattern of multiple adjacent bits from a bit string that represents an input packet set; selecting a second bit pattern of multiple adjacent bits from a first node of a data structure that implements a prefix-compressed decision diagram representing a first class of packets; performing a comparison of the first bit pattern to the second bit pattern; generating an output packet set, which is a subset of the input packet set, in response to the first bit pattern matching the second bit pattern; and applying a network forwarding action to the output packet set, the network forwarding action associated with the prefix-compressed decision diagram and dictating packet forwarding behavior of the network device with respect to the output packet set.

14 Claims, 20 Drawing Sheets

(56) References Cited

U.S. PATENT DOCUMENTS

| | | | |
|---|---|---|---|
| 2015/0092778 A1* | 4/2015 | Jackson | H04L 45/64 370/392 |
| 2017/0250869 A1* | 8/2017 | Voellmy | H04L 43/14 |
| 2020/0183730 A1* | 6/2020 | Durham | G06F 12/1408 |

OTHER PUBLICATIONS

U.S. Appl. No. 15/683,650, filed Aug. 22, 2017.
U.S. Appl. No. 16/041,598, filed Jul. 20, 2018.

* cited by examiner

PACKET FORWARDING IN A NETWORK DEVICE

BACKGROUND

The present disclosure relates to the field of data networks, and, more specifically, to data structures for storing packet-forwarding rules of a network.

Computer networks are essential for the day-to-day operations of many organizations, including business enterprises, government entities, network service providers, online streaming services, and the like. For example, such organizations rely on computer networks for storing and retrieving data, enabling communication between employees, and providing services to customers.

However, as the complexity and scale of modern computer networks has increased, the development of tools to manage their operation has not kept pace. For example, for network administrators to fully understand and manage a computer network, a clear understanding of the state of the network and flow behavior of data traffic in the network is essential. Unfortunately, many tools now available only provide current state information about individual devices, such as servers, routers, and interface, and cannot predict overall behavior of a network or flow of data traffic within a network. With such tools, network administrators are limited to monitoring on-going traffic and reacting to problems as they are detected.

In light of the above, automated systems have been developed for network verification, including the modeling, analysis, and management of data networks. Such automated systems require storage and high-speed access to the large numbers of packet-forwarding rules used in a network to process packets. Due to the high dimensionality common in such rules, for example on the order of tens of dimensions, efficient storage and quick access to such rules can be complex, particularly when some dimensions include long bits, such as Internet Protocol (IP) and media access control (MAC) addresses. For example, hypercubes, bit vectors, and binary decision trees are all potentially suitable means for storing large numbers of such rules, but have drawbacks. For example, storing network packet-forwarding rules in a conventional binary decision tree is feasible, but results in significant overhead, since each bit of an IP or MAC address is considered a variable with an associated decision node.

SUMMARY

One or more embodiments provide systems and methods for storing and accessing packet-forwarding rules used in a network to process packets. According to the embodiments, packet-forwarding rules from a plurality of devices in a network of devices are collected, a plurality of equivalence classes based on the packet-forwarding rules are generated, and each equivalence class is stored in a novel data structure. Each node of the novel data structure includes a variable that references a multi-bit bit pattern from one of the equivalence classes. Decisions implemented at each node are based on a bit pattern of multiple adjacent bits of a packet set, rather than on a single bit of the packet set. Thus, fewer nodes are required for implementation of set operations between equivalence classes and packet sets, which results in more compact storage and faster implementation of the packet-forwarding rule.

According to one embodiment, a method of determining a flow path of a packet set through a network device includes selecting a first bit pattern of multiple adjacent bits from a bit string that represents an input packet set; selecting a second bit pattern of multiple adjacent bits from a first node of a data structure that represents a first class of packets; performing a comparison of the first bit pattern to the second bit pattern; generating an output packet set, which is a subset of the input packet set, based on the comparison; and applying a network forwarding action to the output packet set.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
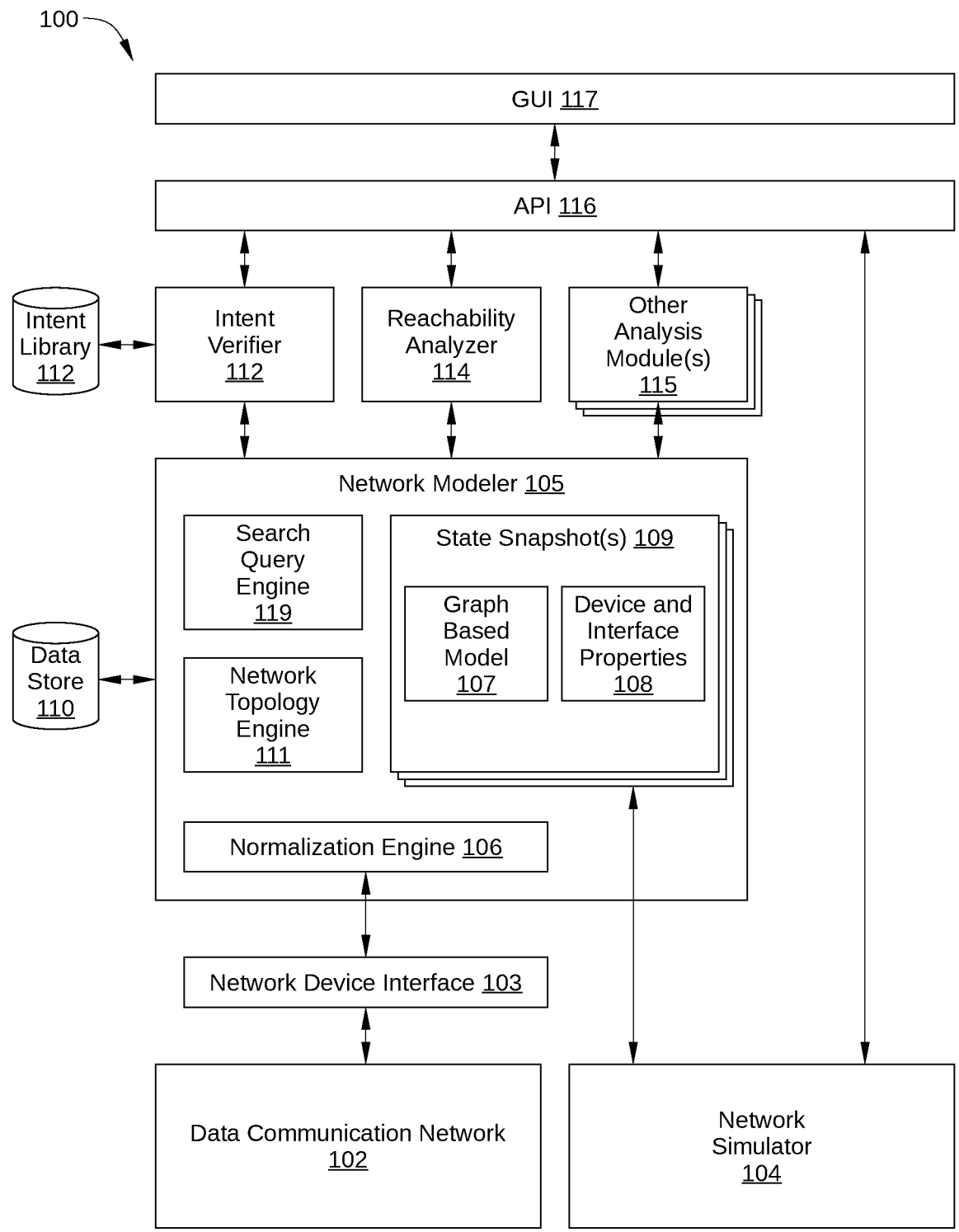
FIG. 1 illustrates a network topology inference system for modeling and analyzing a data communication network, according to various embodiments.

FIG. 1 illustrates a network verification system 100 for modeling and analyzing a data communication network 102, according to various embodiments. In some embodiments, network verification system 100 collects network state information directly from network devices of data communication network 102 and constructs a functional model of data communication network 102. The functional model is based on a physical network topology describing what network devices are coupled to each other via a physical communication link, such as a wired connection. According to various embodiments, network verification system 100 infers the presence of each physical communication link between network devices based on network traffic that is currently flowing in the network and then constructs the network model of data communication network 102.

In some embodiments, network verification system 100 is further configured to model the results of policy verifications that can be used to (a) configure or reconfigure devices within the network to eliminate the violation, (b) trigger an alert on an external network management or security monitoring system, (c) visually illustrate problems in the network to users of the system, and/or (d) trigger an automated change to configurations or block such a change if policy verifications pass or fail. An example of a network verification system is described in U.S. Pat. No. 9,225,601, entitled "Network-Wide Verification of Invariants," the entire content of which is hereby incorporated by reference.

Network verification system 100 is communicatively coupled to network 102, which includes a plurality of network devices (not shown), such as firewalls, routers, switches, virtual switches, etc., via a network device interface 103. Device state information for the plurality of network devices is extracted and sent to a network modeler 105. In addition, in some embodiments, a network simulator 104 produces hypothetical device state information, which is also sent to network modeler 105. In such embodiments, the hypothetical device state information can simulate the effect of a configuration change prior to deployment. Network modeler 105 normalizes input via a normalization engine 106 to produce a single format across a plurality of network device types or manufacturers. In addition, network modeler 105 produces one or more (real or hypothetical) snapshots 109 of data communication network 102 that can include a graph-based model 107 of potential data flow behavior and/or a variety of attributes or properties of devices and interfaces or other objects in data communication network 102. Network verification system 100 may store a multiplicity of snapshots 109, in memory and/or mass storage, such as in data store 110. Network verification system 100 also includes a search query processor 119 to query a network model of data communication network 102 to obtain objects and data flow behavior. Network verification system 100 also includes a network topology engine 111. Network topology engine 111 is configured to determine the current topology of wired connections based on reachability information included in each network device of data communications network 102. An example of a network topology engine is described in U.S. patent application Ser. No. 16/748,655, entitled "SYSTEMS AND METHODS FOR DETERMINING PHYSICAL LINKS BETWEEN NETWORK DEVICES," the entire content of which is hereby incorporated by reference.

Network verification system 100 may also include higher-level analysis modules for querying a particular network model, such as an intent verifier 112 to verify whether network intent matches that of the particular network model, drawing on intent rules built from an intent library 113; a reachability analyzer 114; and potentially other analysis modules 115. The functionality of the verification and analysis models, network modeler 105, and network simulator 104 may be available via an application programming interface (API) 116, which programs and scripts can access directly, and on which a graphical user interface 117 can be built.

Figure 2:
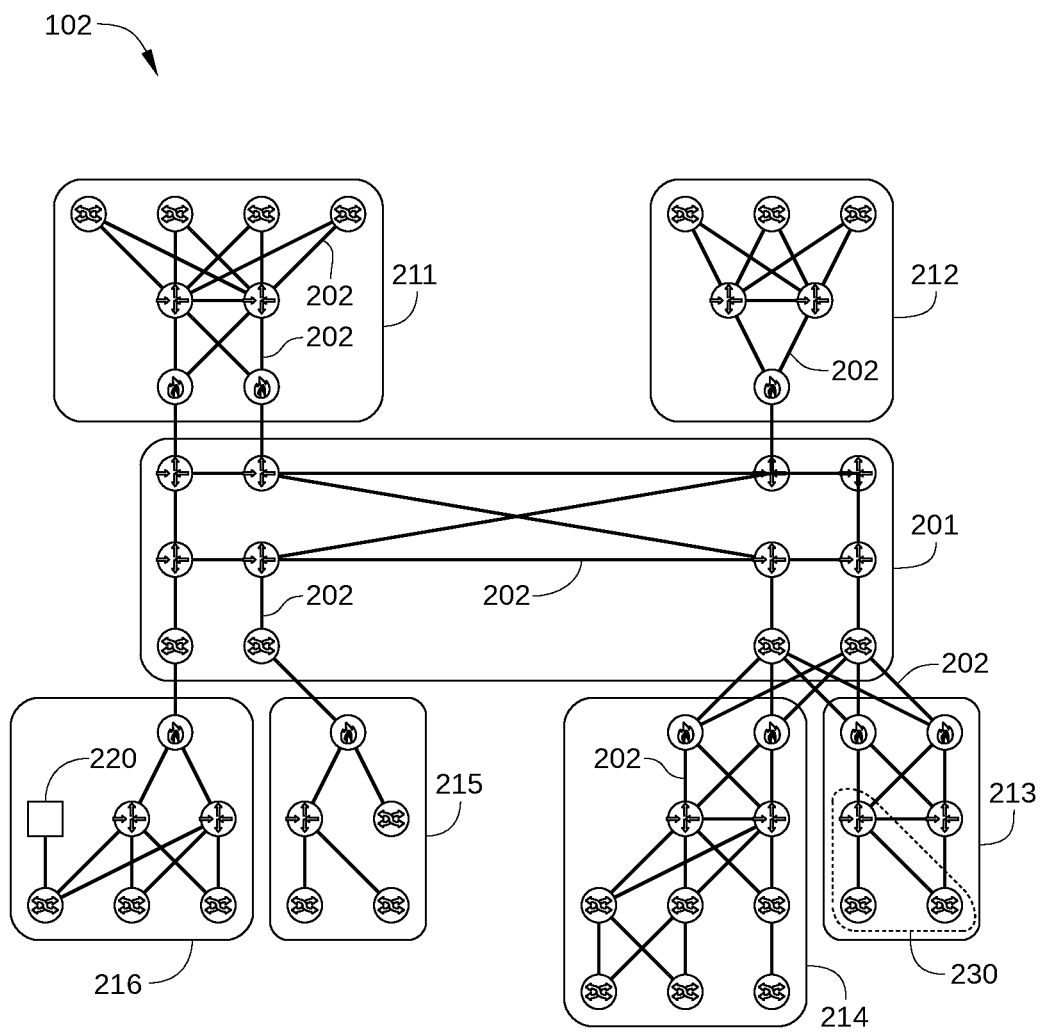
FIG. 2 is a schematic illustration of the data communication network that is coupled to the network topology inference system of FIG. 1, according to an embodiment.

FIG. 2 is a schematic illustration of data communication network 102, according to an embodiment. Data communication network 102 is a computer network that is communicatively coupled to network verification system 100 and includes one or more network devices, such as firewalls, routers, switches, and the like, and a plurality of host devices, such as desktop computers, servers, and the like. In the embodiment illustrated in FIG. 2, data communication network 102 is configured with a backbone 201 and subnets 211-216. Backbone 201 and subnets 211-216 each include one or more firewalls, routers, and/or switches, and a plurality of host devices. For clarity, the plurality of host devices of data communication network 102 are not shown in FIG. 2, with the exception of an edge host 220 in which, in some embodiments, network verification system 100 resides or is executed. As shown, the firewalls, routers, switches, and host devices of data communication network 102 are communicatively coupled by physical communication links, such as wired connections 202. In some embodiments, an up-to-date topology of wired connections 202 between network devices of data communication network 102 are determined via network topology engine 111.

Rule Tables in a Network Model

As noted above, network verification system 100 in FIG. 1 is configured to generate to a network model that provides state and predicted flow behavior of a particular computer network. To that end, predicted data flow behavior and/or attributes or properties of devices, interfaces, and/or other objects in data communication network 102 are stored in one of snapshots 109. In some embodiments, a snapshot 109 of data communication network 102 generates a data structure that is configured to store packet forwarding rules for the network devices of data communication network 102. According to various embodiments, the data structure that is generated implements a prefix-compressed decision diagram. A static network model and the associated rule tables that are stored in such a prefix-compressed decision diagram are described below in conjunction with FIGS. 3-5.

Figure 3:
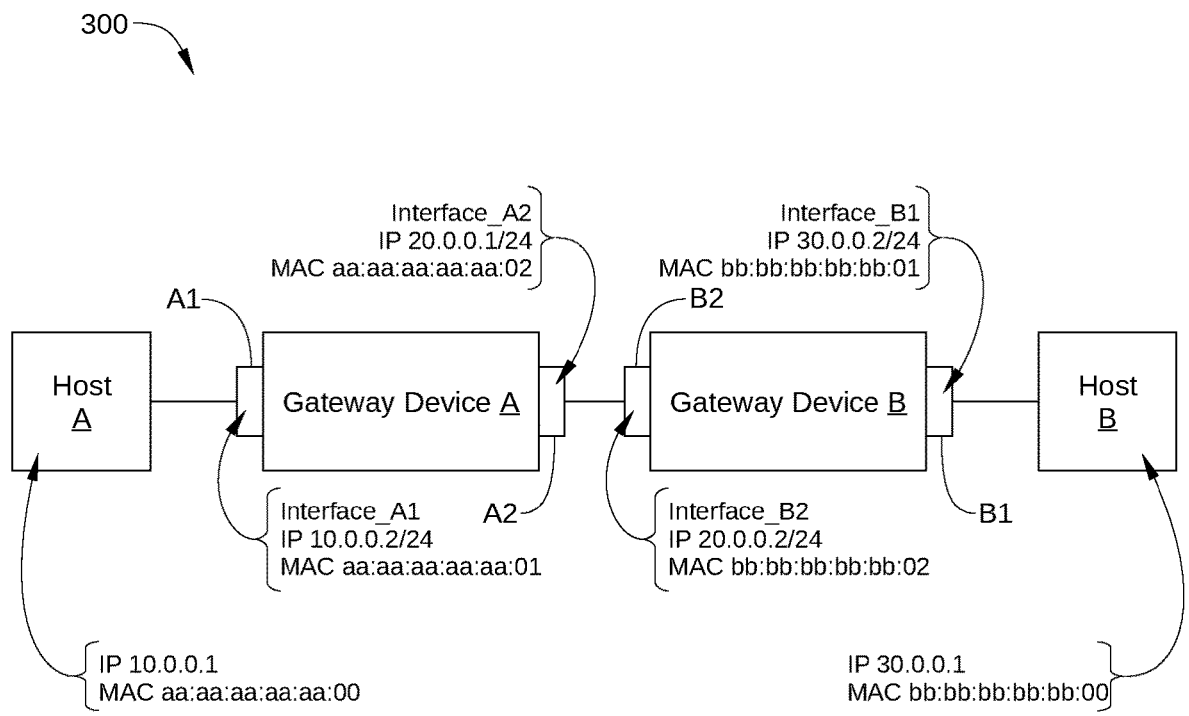
FIG. 3 is a schematic illustration of a simple physical network to which certain embodiments can be applied.

FIG. 3 is a schematic illustration of a simple physical network 300, according to an embodiment. As shown, physical network 300 includes a host A communicatively coupled to a gateway device A and a host B communicatively coupled to a gateway device B. In addition, gateway device A is communicatively coupled to gateway device B.

Host A and host B each have IP addresses and MAC addresses as shown, and are located in two different IP subnets.

Gateway devices A and B can each be any technically feasible hardware device that acts as a gateway between two networks or subnets. Thus, gateway device A and/or gateway device B may be a router, a firewall, a server, or any other device that enables data traffic to flow in and out of the nodes of an associated network or subnet. Further, gateway devices A and B are generally also nodes within the associated network or subnet. Gateway device A includes interfaces A1 and A2 with IP addresses and MAC addresses as shown and gateway device B includes interfaces B1 and B2 with IP addresses and MAC addresses as shown. In the embodiment illustrated in FIG. 3, gateway device A and gateway device B are directly connected, and interfaces A1, A2, B1, and B2 are Layer 3 interfaces. In other embodiments, many other network devices may be communicatively disposed between gateway device A and gateway device B.

Figure 4:
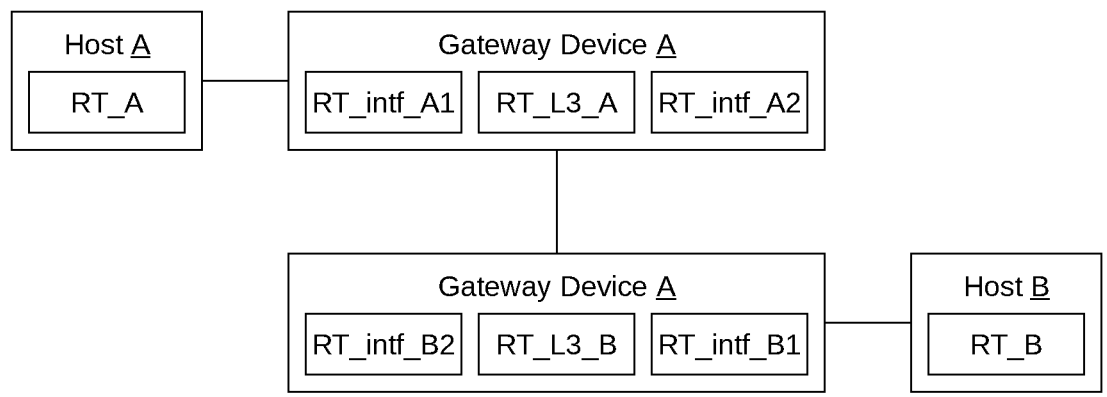
FIG. 4 is a schematic illustration of a static network model of the physical network of FIG. 3, according to an embodiment.

FIG. 4 is a schematic illustration of a static network model 400 of physical network 300, according to an embodiment. Static network model 400 represents a graph-based model of physical network 300 that is configured with nodes and directed actions between the nodes. Thus, static network model 400 is a rule table level static model of physical network 300 and, as such, includes at least one rule table for each node of physical network 300. Specifically, host A includes rule table RT_A, host B includes rule table RT_B, gateway device A includes rule tables RT_intf_A1, RT_L3_A, and RT_intf_A2, and gateway device B includes rule tables RT_intf_B1, RT_L3_B, and RT_intf_B2.

In static network model 400, a rule table (RT) is a table inside a particular forwarding device, and includes rules that define the forwarding of packets from that forwarding device. For example, an IP routing table, a MAC address table, an address resolution protocol (ARP) table, an access-control list (ACL), and the like can be included in rule tables for host A, host B, gateway device A, and gateway device B. In addition to rule tables, flow nodes are employed in static network model 400 to facilitate determination of flow paths for packet sets in physical network 300. Embodiments of flow nodes associated with static network model 400 are described below in conjunction with FIG. 5.

Figure 5:
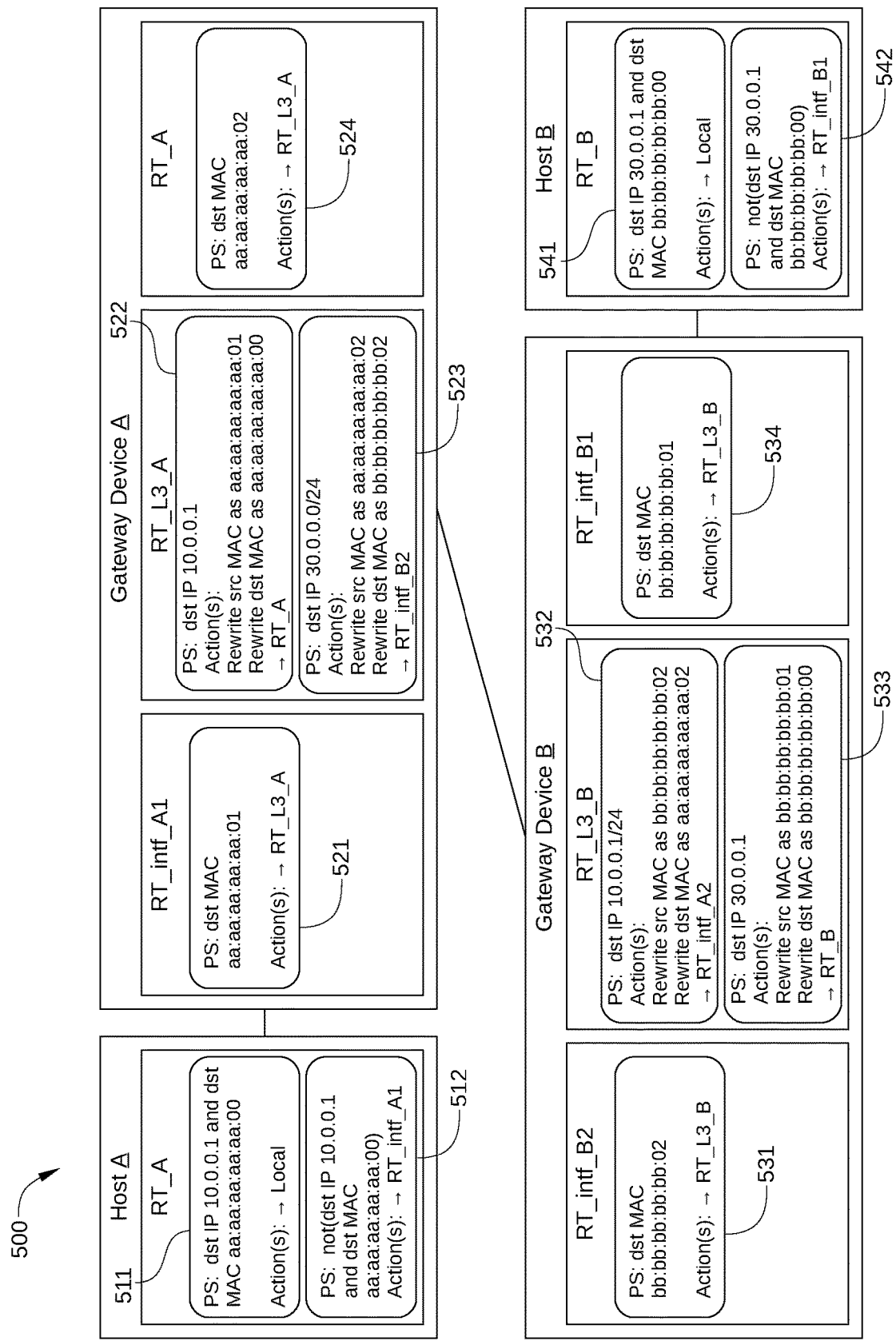
FIG. 5 is a schematic illustration of a static network model of the physical network of FIG. 3 that includes flow nodes, according to an embodiment.

FIG. 5 is a schematic illustration of a static network model 500 of physical network 300 that includes flow nodes, according to an embodiment. A flow node (FN) represents a pair consisting of a rule table and a packet set, where a packet set is a group of packets to be sent to a defined group or range of IP addresses. Thus, a flow node is a vertex in a graph model of a network, and indicates how a particular network object treats packets that belong to a particular packet set. In some embodiments, the data structure of a flow node includes a packet set and a list of one or more actions. In the embodiment illustrated in FIG. 5, host A includes flow nodes 511 and 512, gateway device A includes flows nodes 521, 522, 523, and 524, gateway device B includes flows nodes 531, 532, 533, and 534, and host B includes flow nodes 541 and 542.

In some embodiments, search query processor 119 or another analysis module 115 of network verification system 100 queries static network model 500 of physical network 300 to obtain data flow behavior. For example, a flow path of a particular packet set in physical network 300 may be determined by performing a hop-by-hop traversal of static network model 500 from a particular starting device to a destination associated with the packet set. To facilitate such flow path determination, in some embodiments, equivalence classes are generated from the rule tables of static network model 500. Equivalence classes and equivalence class generation are described below in conjunction with FIGS. 6 and 7A-7E.

Figure 6:
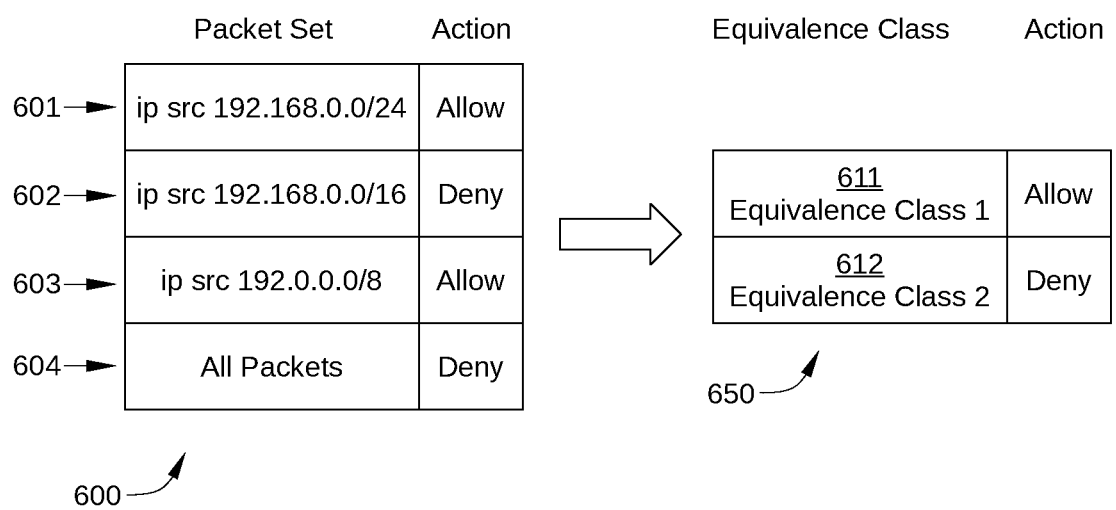
FIG. 6 schematically illustrates a rule table for a device in a physical network and equivalence classes generated from the rule table, according to an embodiment.

FIG. 6 schematically illustrates a rule table 600 for a device in a physical network and equivalence classes 650 generated from rule table 600, according to an embodiment. Rule table 600 can be a rule table associated with any network device in a network of devices, such as data communication network 102 of FIG. 1 or physical network 300 of FIG. 3. In the embodiment illustrated in FIG. 6, rule table 600 corresponds to an ACL, and includes four rules 601-604 of descending priority, where each rule includes a packet set and a corresponding action. Thus, when a packet is received by the network device associated with rule table 600, rule 601 is first applied to the packet, if applicable. If rule 1 is not applicable to the packet, then rule 602 is applied to the packet if applicable, and so on. To facilitate flow path determination in a network model, rules 601-604 are consolidated into one or more equivalence classes 650 that are associated with packets processed by the network device associated with rule table 600.

Each of the equivalence classes 650 for the network device associated with rule table 600 corresponds to a different action that is performed by the network device. Thus, because two different actions are associated with rule table 600 in the embodiment illustrated in FIG. 6, rules 601-604 are consolidated into two equivalence classes: equivalence class 611 and equivalence class 612. Equivalence class 611 includes packets that are allowed by the network device associated with rule table 600, and equivalence class 612 includes packets that are denied by the network device associated with rule table 600. In some embodiments, a rule table can include more than two possible actions. In such embodiments, the rule table include a corresponding number of different equivalence classes.

Figure 7A:
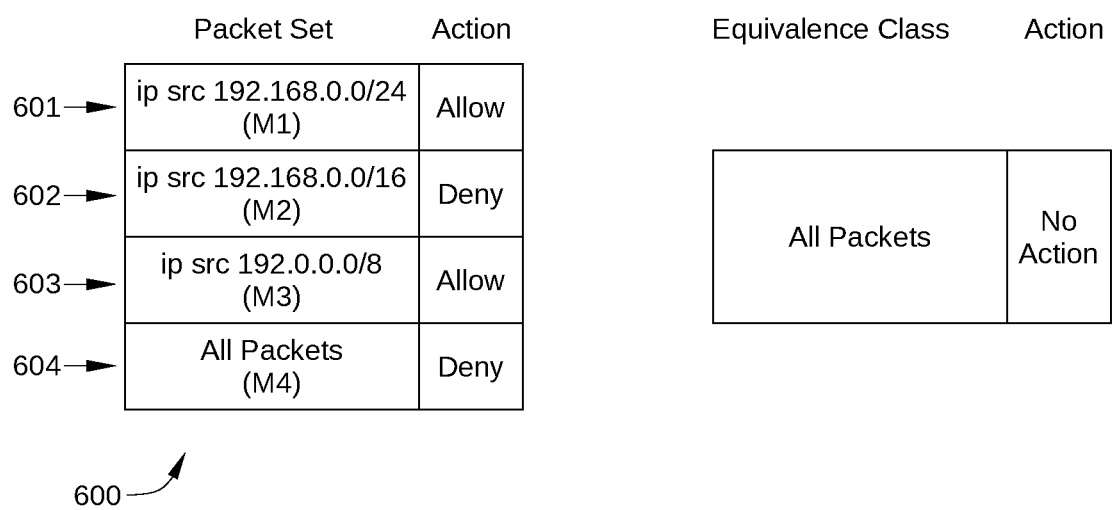
FIGS. 7A-7E schematically illustrate steps in a process of generating the equivalence classes of FIG. 6, according to an embodiment.

FIGS. 7A-7E schematically illustrate steps in a process of generating equivalence classes 611 and 612, according to an embodiment. In FIG. 7A, no equivalence class has yet been defined, and therefore no packet sets have been associated with an equivalence class. Thus, no action is indicated for all packets. For ease of description, the packet set associated with rule 601 is labeled M1, the packet set associated with rule 602 is labeled M2, the packet set associated with rule 603 is labeled M3, and the packet set associated with rule 604 is labeled M4.

Figure 7B:
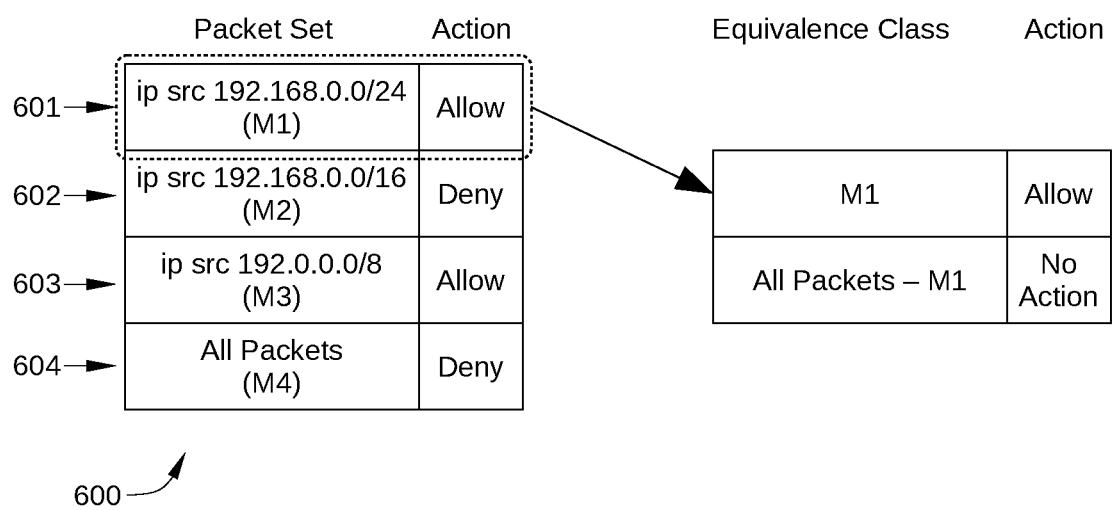
Figure 7C:
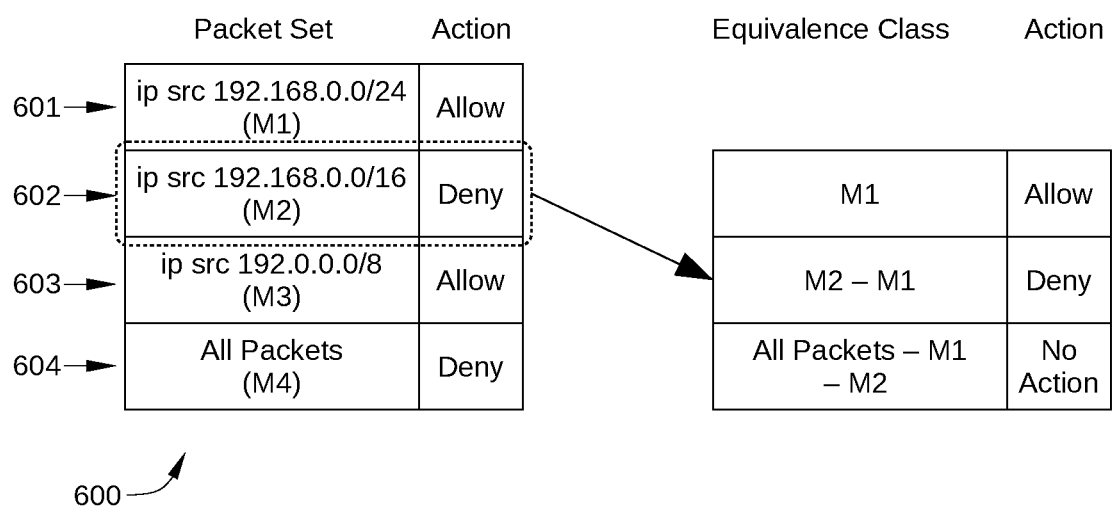
Figure 7D:
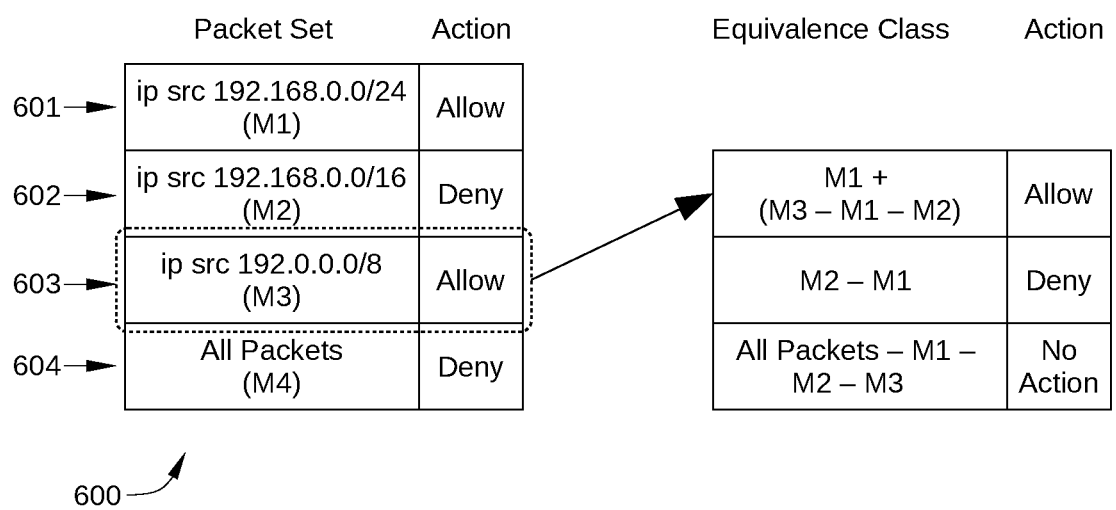
Figure 7E:
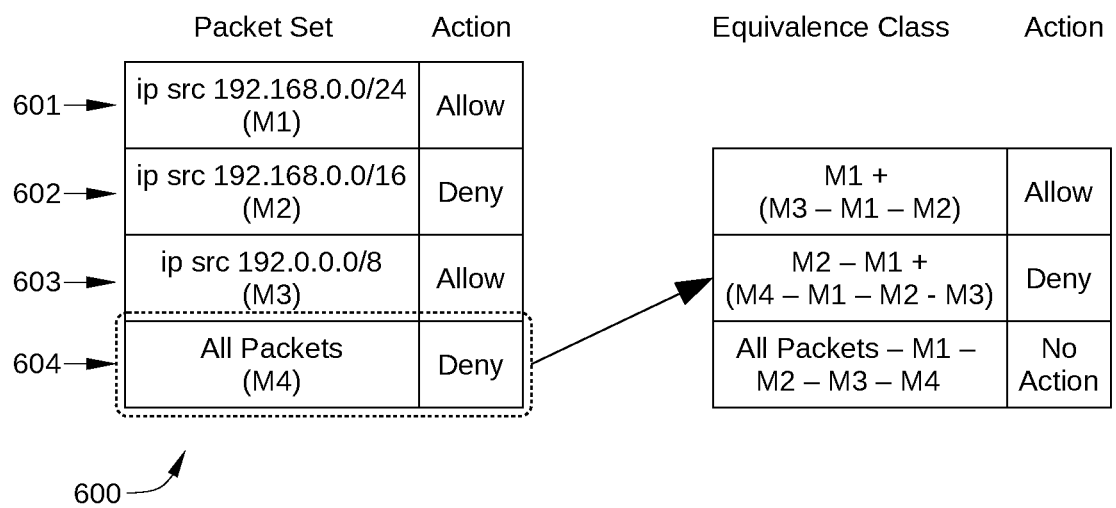

In FIG. 7B, equivalence class 611, which corresponds to the "Allow" action, is generated and packet set M1 of rule 601 is included therein. As a result, the set of packets for which no action has been determined is (all packets)—M1, where the minus operation is a set subtraction operation. In FIG. 7C, equivalence class 612, which corresponds to the "Deny" action, is generated and the set of packets affected by rule 602 is included therein. As a result, the set of packets for which no action has been determined is (all packets)—M1-M2, where the minus operation is a set subtraction operation. Because rule 601, which is applied to packet set M1, has a higher priority than rule 602, which is applied to packet set M2, the set of packets included in equivalence class 612 does not include all packets of packet set M2. Instead, the set of packets included in equivalence class 612 includes all packets of packet set M2 that are not included in packet set M1, i.e., M2-M1, where the minus operation is a set subtraction operation. In FIG. 7D, the set of packets affected by rule 603 (i.e., M3-M1-M2) is added to equivalence class 611. As a result, the set of packets for which no action has been determined is (all packets)—M1-M2-M3. In FIG. 7E, the set of packets affected by rule 604 (i.e., M4-M1-M2 -M3) is added to equivalence class 612. As a result, the set of packets for which no action has been determined is (all packets)—M1-M2-M3-M4, which is the empty set.

As a result of the above operations, equivalence class 611 includes the union of packet set M1 and (M3-M1-M2), while equivalence class 612 includes M2-M1+(M4-M1-M2-M3). According to various embodiments, equivalence classes for a data communication network, such as equivalence class 611 and equivalence class 612, are stored in a corresponding data structure. In addition, the packet sets associated with such equivalence classes, such as packet sets M1, M2, M3, and M4, can also be stored in such data structures. The data structure allows implementation of the appropriate set operations, such as A union B (indicated above with +) and A intersect with not B (indicated above with -) that are employed to generate equivalence classes. Further, the data structure can be employed in conjunction with set operations as part of network verification processes, in which an intersection of a packet set with one or more equivalence classes is determined. In the embodiments, the data structure implements a prefix-compressed decision diagram. By contrast, conventional network validation systems store equivalence classes and/or packet-forwarding rules in a data structure that implements a binary decision tree, an instance of which is described below in conjunction with FIG. 8, or a binary decision diagram, an instance of which is described below in conjunction with FIG. 9.

Figure 8:
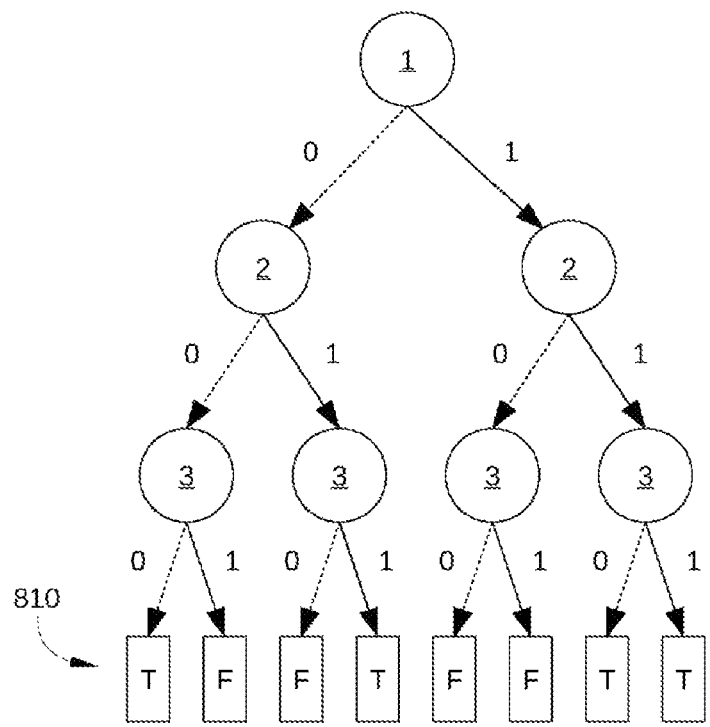
FIG. 8 schematically illustrates a conventional binary decision tree that is employed to represent a certain function based on a particular variable assignment.

FIG. 8 schematically illustrates a conventional binary decision tree 800 that can be employed to represent a certain function based on a particular variable assignment. Binary decision tree 800 includes three variables (1, 2, and 3) and a plurality of terminal nodes 810, where each terminal node corresponds to a value of the function represented by binary decision tree 800. In applications for representing packet-forwarding and other rules for a data communication network, each variable of binary decision tree 800 may correspond to a bit from a bit string associated with a particular rule or equivalence class. For example, in some instances, each variable of binary decision tree 800 corresponds to a bit from a bit string that represents packet header information for a packet set. Generally, such a bit string includes a large number of bits, e.g., 48 bits, 128 bits, etc. Thus, in packet-forwarding applications, binary decision tree 800 generally includes many more than the three variables depicted in FIG. 8, typically one variable for each bit of the bit string representing packet header information.

As shown in FIG. 8, binary decision tree 800 is a decision tree that includes every possible bit combination. Thus, for a function that includes three bits, binary decision tree 800 has eight possible terminal nodes 810, for a function that includes four bits, binary decision tree 800 has sixteen possible terminal nodes 810, and so on. Generally, there are only two different categories of terminal nodes 810, which are illustrated in FIG. 8 as "True" nodes and "False" nodes. As a result, the majority of terminal nodes 810 are redundant. Consequently, in practice, in packet-forwarding applications binary decision tree 800 is collapsed into a binary decision diagram, in which redundant terminal nodes 810 are represented by a single terminal node, as illustrated in FIG. 9.

Figure 9:
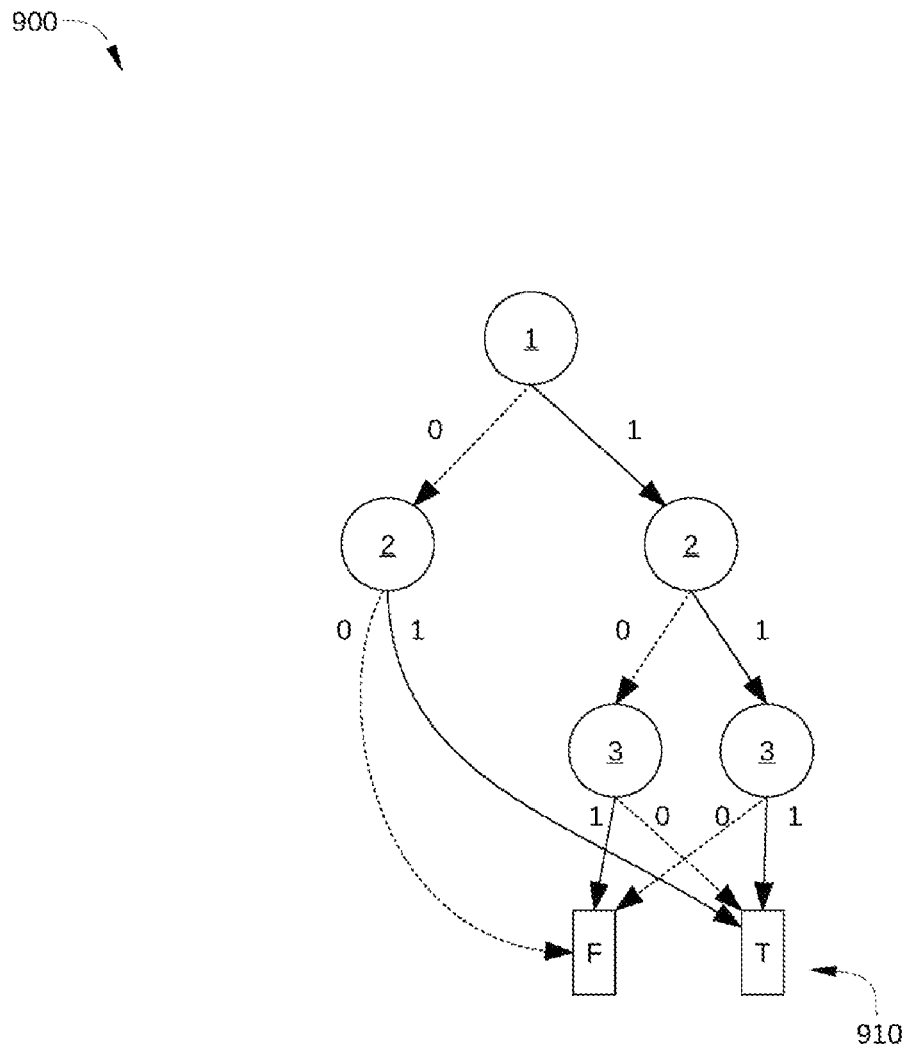
FIG. 9 schematically illustrates a conventional binary decision diagram that is employed to represent the same function as that represented by the binary decision tree of FIG. 8.

FIG. 9 schematically illustrates a conventional binary decision diagram 900 that can be employed to represent the same function as that represented by binary decision tree 800 of FIG. 8. Binary decision diagram 900 is generated by maximally reducing binary decision tree 800. Consequently, binary decision diagram 900 has the same number of variables as binary decision tree 800 (i.e., three), but fewer total decision nodes. First, the redundant terminal nodes of binary decision tree 800 are eliminated, leaving only two terminal nodes 910 in binary decision diagram 900. Second, redundant decision nodes are eliminated. Thus, binary decision diagram 900 requires fewer computational resources than binary decision tree 800 to store the same packet-forwarding rule. However, for relatively sparse functions that have little branching, such as a packet-forwarding rule that is applicable to a small set of long MAC or IP addresses, binary decision diagram 900 has significant overhead. For example, the binary decision diagram representing a rule that applies to packets from a specific 48-bit MAC address includes 48 variables, i.e., one variable per bit. As a result, such a simple packet-forwarding rule requires significant overhead when represented as a binary decision diagram. According to various embodiments, a prefix-compressed decision diagram is employed to more efficiently store and provide access to packet-forwarding rules. An embodiment of one such embodiment is described below in conjunction with FIG. 10.

Prefix-Compressed Decision Diagram

Figure 10:
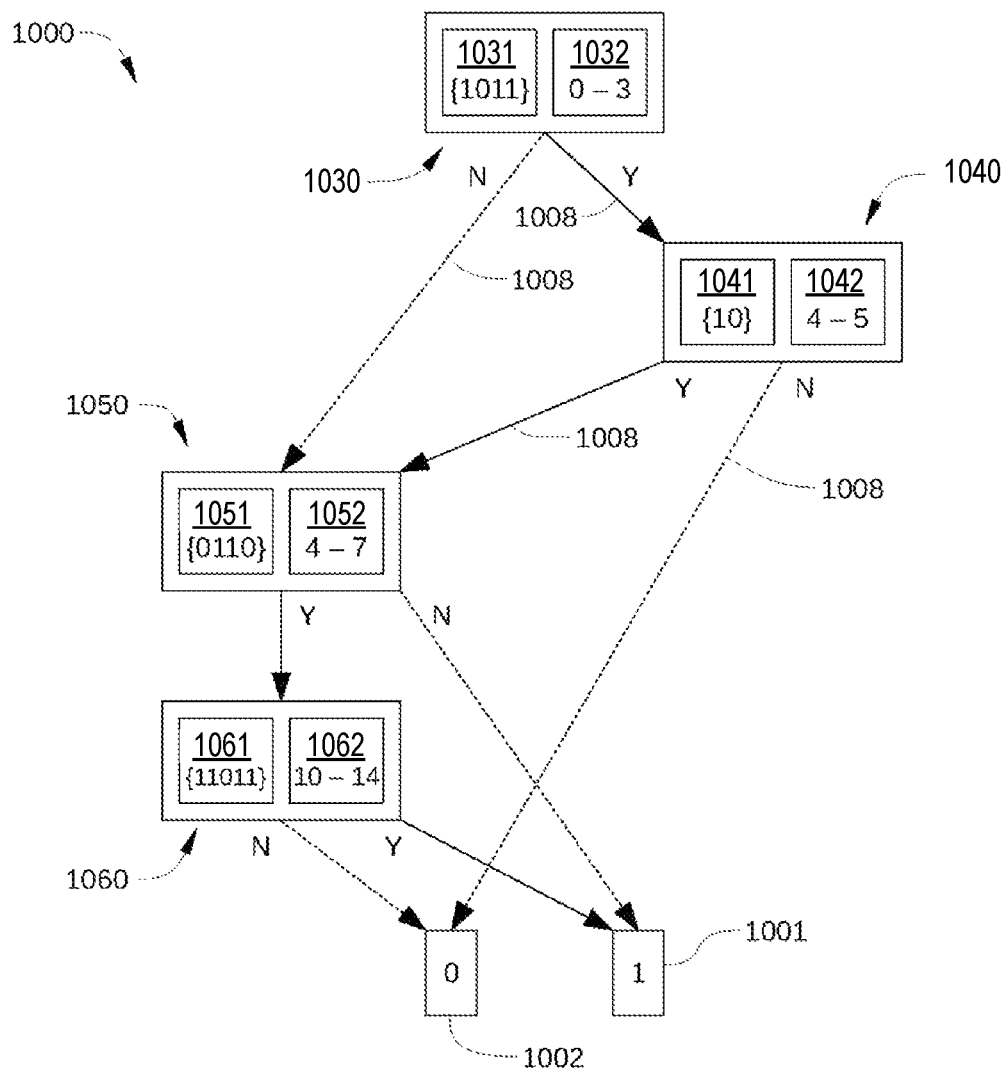
FIG. 10 schematically illustrates a prefix-compressed decision diagram, according to an embodiment.

FIG. 10 schematically illustrates a prefix-compressed decision diagram 1000, according to an embodiment. Similar to a binary decision diagram, prefix-compressed decision diagram 1000 is implemented in a data structure to represent a certain function based on a particular variable assignment. For example, according to various embodiments, a prefix-compressed decision diagram can be employed to represent a particular packet set that is affected by a specific packet-forwarding rule or that corresponds to the packets included in a specific equivalence class. Further, in such embodiments, a prefix-compressed decision diagram can represent a particular packet set that is employed in a network validation procedure. In the latter case, the prefix-compressed decision diagram can undergo set operations with another prefix-compressed decision diagram, such as one that represents a particular packet set affected by a specific packet-forwarding rule or corresponding to the packets included in a specific equivalence class. Unlike a binary decision diagram, some or all variables of prefix-compressed decision diagram 1000 include a bit pattern of multiple adjacent bits from the particular packet set. For example, the bit pattern can be selected from a group of adjacent bit locations in a bit string that represents packet header information for the particular packet set.

In the embodiment illustrated in FIG. 10, prefix-compressed decision diagram 1000 includes four decision nodes 1030, 1040, 1050, and 1060 and two terminal nodes 1001 and 1002. As shown, decision node 1060 is a child node of decision node 1050, decision node 1050 is a child node of decision node 1040, and decision node 1040 is a child node of decision node 1030. Decision nodes 1030, 1040, 1050, and 1060 are connected as shown by Yes/No decision arrows 1008, which may be pointers indicating a specific memory location of the next child node or terminal node. Prefix-compressed decision diagram 1000 can be employed to represent a packet set, such as the set of packets to which a specific forwarding rule is applicable, the set of packets that belong to a particular equivalence class, or a set of packets employed in a particular network verification procedure.

Each of decision nodes 1030, 1040, 1050, and 1060 includes a variable for determining the value of the function represented by prefix-compressed decision diagram 1000. Thus, certain information included in a packet set, such as packet header information, is extracted from the packet set and is employed as the values of the variables of decision nodes 1030, 1040, 1050, and 1060 to determine the output of the function. As shown, the output of the function is represented by terminal nodes 1001 and 1002. For example, terminal node 1001 may correspond to a "True" output and terminal node 1002 may correspond to a "False" output.

The output of the function represented by prefix-compression decision diagram 1000 is determined using bit patterns from an input packet set, such as a packet set that is employed in a network verification process. To determine an output packet set that corresponds to the intersection of the input packet set with the packet set represented by prefix-compression decision diagram 1000 (e.g., a particular equivalence class), the values for the variables of decision nodes 1030, 1040, 1050, and 1060 are selected from the input packet set, in the form of multiple-bit bit patterns. It is noted that a particular set of values of bit patterns selected from the input packet set corresponds to a specific subset of the input packet set. Thus, when a particular set of bit patterns are selected from the input packet set and used as values for decision nodes 1030, 1040, 1050, and 1060, and the output of the function represented by prefix-compression decision diagram 1000 is terminal node 1001 (True), the specific subset of the input packet set is indicated to be included in the output packet set. Conversely, when the output of prefix-compressed decision diagram 1000 is terminal node 1002 (False), the specific subset of the input packet set is indicated to be excluded from the output packet set.

In the context of network verification, prefix-compressed decision diagram 1000 may represent a particular equivalence class, and therefore has a forwarding action associated therewith. Thus, when a subset of an input packet set is determined to be included in an output packet set of prefix-compressed decision diagram 1000, the subset of the input packet set undergoes the forwarding action associated with the particular equivalence class.

Each of decision nodes 1030, 1040, 1050, and 1060 includes as a variable a bit pattern of multiple adjacent bits from an input packet set. Each of decision nodes 1030, 1040, 1050, and 1060 further includes bit locations indicating a location within the input packet set of the corresponding bit pattern, such as a location within a bit string representing packet head information for the packet set. Thus, decision node 1030 includes a bit pattern 1031 as a variable and a bit location 1032, decision node 1040 includes a bit pattern 1041 as a variable and a bit location 1042, decision node 1050 includes a bit pattern 1051 as a variable and a bit location 1052, and decision node 1060 includes a bit pattern 1061 as a variable and a bit location 1062. In the embodiment illustrated in FIG. 10, bit pattern 1031 is {1011} and bit location 1032 is bits 0-3 (which refers to the first four bits of packet header information 1006 of received packet 1005); bit pattern 1041 is {10} and bit location 1042 is bits 4-5; bit pattern 1051 is {0110} and bit location 1042 is bits 4-7; and bit pattern 1061 is {11011} and bit location 1062 is bits 10-14.

In operation, the binary decisions implemented at each of decision nodes 1030, 1040, 1050, and 1060 are based on a bit pattern of multiple adjacent bits of an input packet set (not shown), rather than on a single bit of the input packet set. Thus, fewer nodes are required for performing an intersection operation between the input packet set and the packet set represented by prefix-compressed decision diagram 1000, resulting in more compact storage and faster implementation of the packet-forwarding rule.

In the embodiment illustrated in FIG. 10, prefix-compressed decision diagram 1000 is implemented after undergoing normal reduction, where redundant decision nodes and terminal nodes are eliminated with the use of a hash table to track common decision nodes. Alternately, prefix-compressed decision diagram 1000 can be implemented as a complete prefix-compressed binary decision tree. For example, in the embodiment illustrated in FIG. 10, the function represented by prefix-compressed decision diagram 1000 can instead be represented by a prefix-compressed binary decision tree that can include up to 16 terminal nodes, eight instances of decision node 1060, four instances of decision node 1050, and two instances of decision node 1040.

In some embodiments, multiple packet-forwarding rules can be represented with a single decision node. For example, in instances in which the bit location of a child node is adjacent to a bit location of a parent node, the two decision nodes can be merged into a single decision node. One such embodiment is illustrated in FIG. 11.

Figure 11:
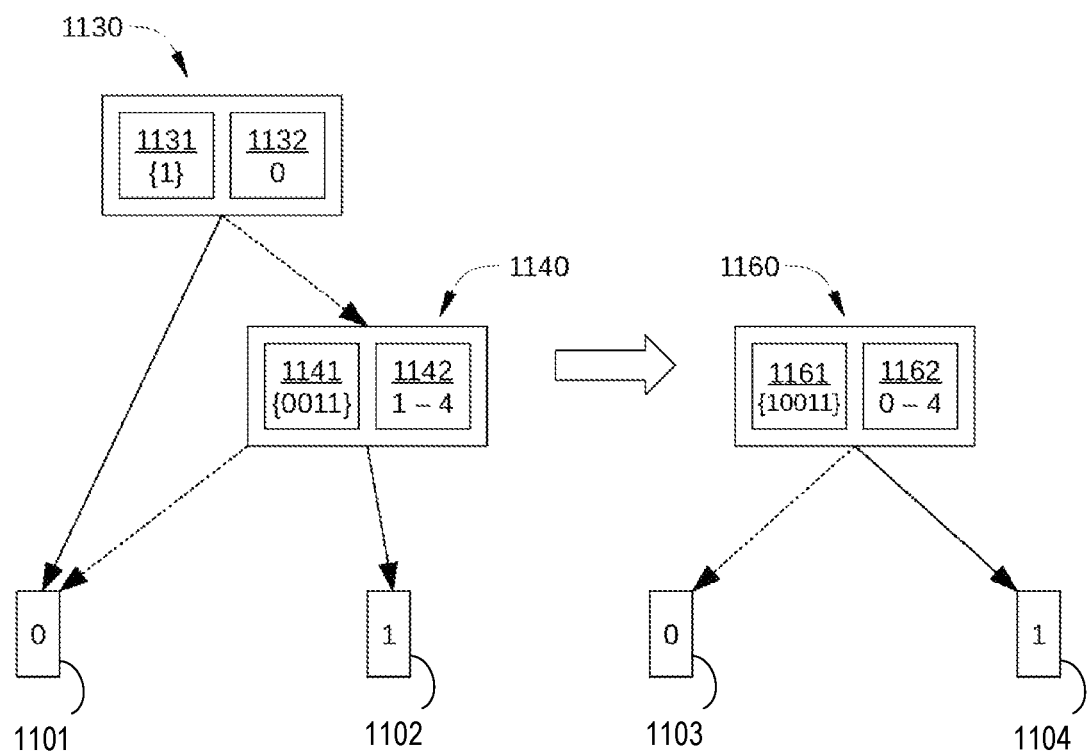
FIG. 11 schematically illustrates a process of merging two decision nodes into a single decision node, according to an embodiment.

FIG. 11 schematically illustrates a process of merging two decision nodes into a single decision node, according to an embodiment. FIG. 11 shows two initial decision nodes 1130 and 1140 and a merged decision node 1160, where decision node 1140 is a child node of decision node 1130. FIG. 11 further includes terminal nodes 1101-1104. Initial decision nodes 1130 and 1140 each represent a portion of a prefix-compressed decision diagram for a particular packet set. As shown, initial decision node 1130 includes as a variable a bit pattern 1131 (which is {1}) and a bit location 1132 (bit 0), and decision node 1140 includes as a variable a bit pattern 1141 (which is {0011}) and a bit location 1142 (bits 1-4). Because bit location 1132 is adjacent to bit location 1142, and because decision node 1140 is a child node of decision node 1130, decision nodes 1130 and 1140 can be combined into decision node 1160 as shown, which includes a bit pattern 1161 (which is {10011}) and a bit location of 0-4 bits. Thus, the bit patterns of decision node 1130 and 1140 are concatenated and the bit locations of decision node 1130 and 1140 are concatenated. In this way, the memory required to store the packet-forwarding rules associated with decision nodes 1130 and 1140 is reduced.

Figure 12:
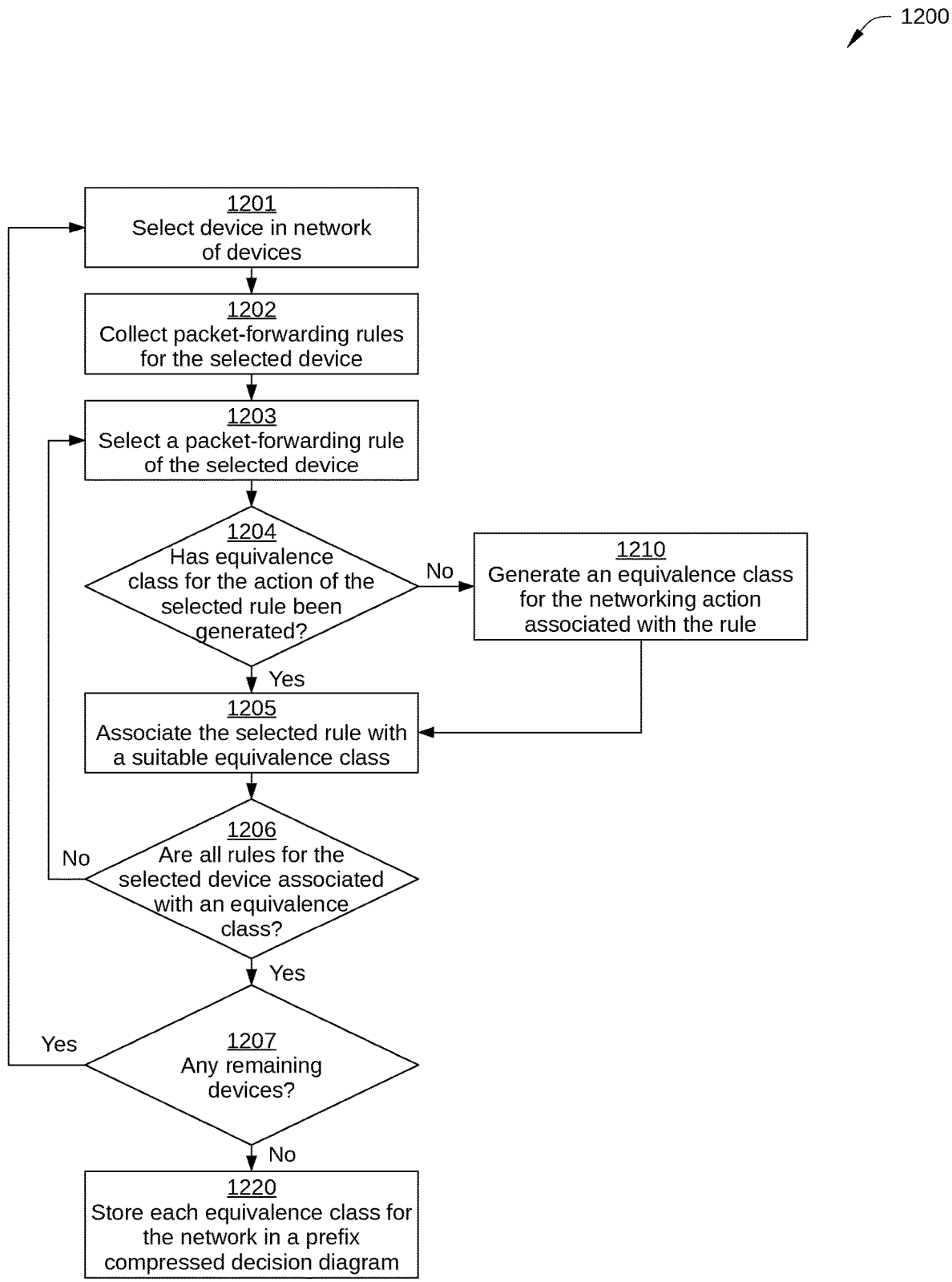
FIG. 12 sets forth a flowchart of method steps for generating a data structure of packet forwarding rules for a network of devices, according to an embodiment.

FIG. 12 sets forth a flowchart of method steps for generating a data structure of packet forwarding rules for a network of devices, according to an embodiment. The method steps are performed for a specific instance of data communication network 102. Although the method steps are described in conjunction with network verification system 100 of FIG. 1-11, persons skilled in the art will understand that the method steps may be performed with other types of systems.

A method 1200 begins at step 1201, where network verification system 100 selects a first network device in data communication network 102. In step 1202, network verification system 100 collects packet-forwarding rules for the selected device, for example from one or more rule tables associated with the selected device. In some embodiments, the selected device is queried for the packet-forwarding rules. Alternatively, such packet-forwarding information may be collected from elsewhere within data communication network 102. In step 1203, network verification system 100 selects a packet-forwarding rule of the selected device. In step 1204, network verification system 100 determines whether an equivalence class has already been generated for the packet-forwarding rule selected in step 1203. If yes, method 1200 proceeds to step 1205; if no, method 1200 proceeds to step 1210.

In step 1205, network verification system 100 associates the selected packet-forwarding rule with a suitable equivalence class that was generated in step 1203. Thus, for a packet-forwarding rule that results in a Deny action, that packet-forwarding rule is associated with the equivalence class that was generated for all Deny actions at the selected device. In step 1206, network verification system 100 determines whether all rules for the selected device have been associated with an equivalence class. If yes, method 1200 proceeds to step 1207; if no, method 1200 returns to step 1204.

In step 1207, network verification system 100 determines whether there are any remaining network devices for which the packet-forwarding rules have not been associated with an equivalence class. If yes, method 1200 returns to step 1201; if no, method 1200 proceeds to step 1220.

In step 1210, network verification system 100 generates an equivalence class for the forwarding action associated with the packet-forwarding rule selected in step 1203. In step 1220, network verification system 100 stores each equivalence class for data communication network 102 in a prefix-compressed decision diagram.

Figure 13:
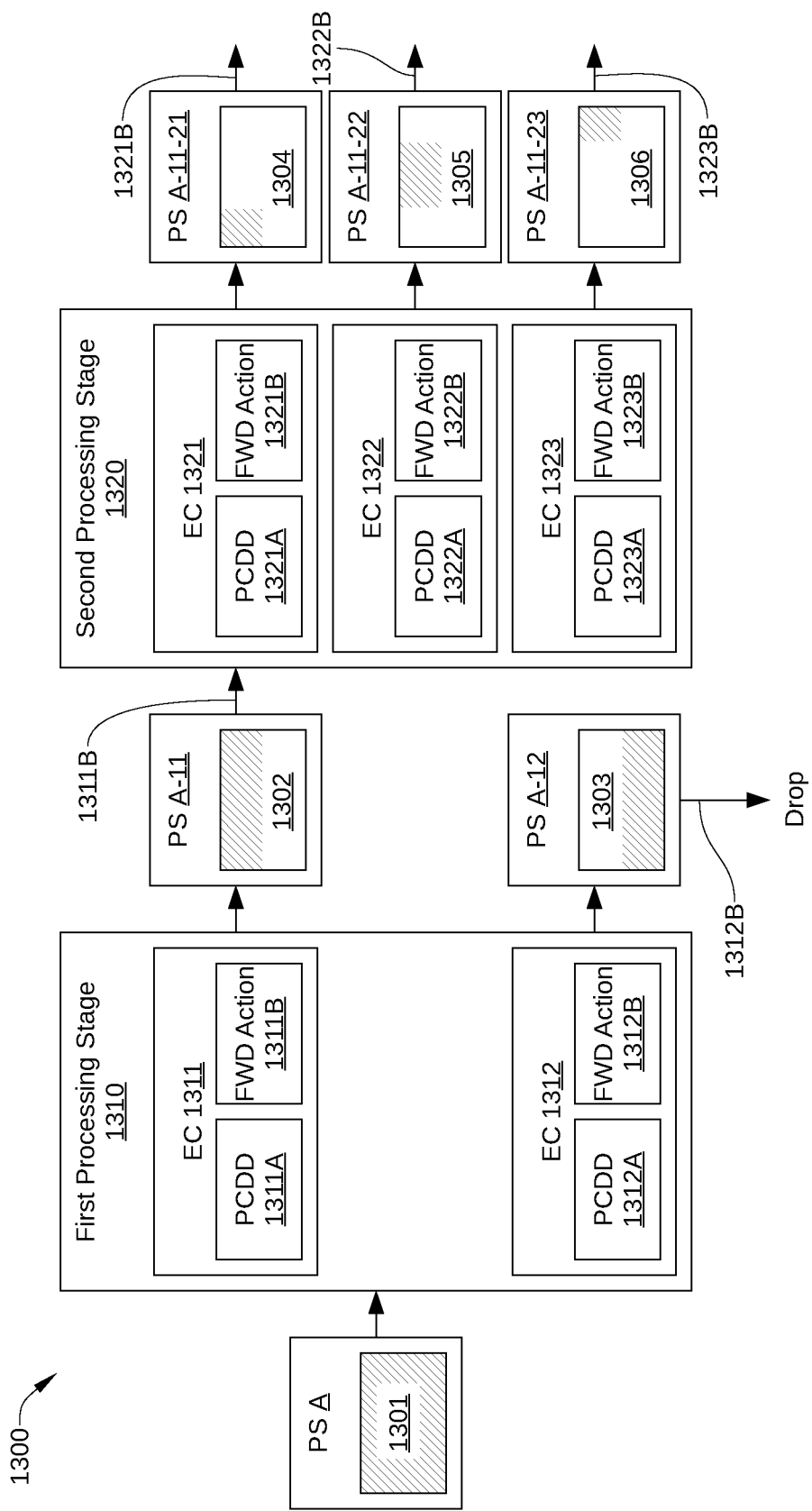
FIG. 13 schematically illustrates a portion of a verification process, according to an embodiment.

FIG. 13 schematically illustrates a portion 1300 of a verification process, according to an embodiment. FIG. 13 shows a first processing stage 1310, a second processing stage 1320, and packet sets generated in the course a verification process that includes first processing stage 1310 and second processing stage 1320.

First processing stage 1310 and second processing stage 1320 each correspond to a different rule table associated with a data communication network. In some embodiments, first processing stage 1310 and second processing stage 1320 are both associated with different network devices, and in some embodiments, first processing stage 1310 and second processing stage 1320 are associated with a single network device.

First processing stage 1310 is a processing stage of a network model that includes two possible packet forwarding actions (for example, Allow and Deny), and as such includes two equivalence classes EC 1311 and EC 1312. Thus, packet forwarding rules included in first processing stage 1310 are collapsed into EC 1311 and EC 1312. Similarly, second processing stage 1320 is a processing stage of the network model that includes three possible packet forwarding actions (for example, routing certain packet sets to three different network devices). As such, second processing stage 1320 includes three equivalence classes EC 1321, EC 1322, and EC 1323.

Each equivalence class of first processing stage 1310 and second processing stage 1320 includes a prefix-compressed decision diagram (PCDD), which is a data structure for storing the packet set information of the equivalence class, and a packet forwarding action. Thus, EC 1311 includes a PCDD 1311A and a forwarding action 1311B, EC 1312 includes a PCDD 1312A and a forwarding action 1312B, EC 1321 includes a PCDD 1321A and a forwarding action 1321B, EC 1322 includes a PCDD 1322A and a forwarding action 1322B, and EC 1323 includes a PCDD 1323A and a forwarding action 1323B.

The forwarding actions of first processing stage 1310 and second processing stage 1320 can include any forwarding action that is performed by one or more network devices of the network modeled by first processing stage 1310 and second processing stage 1320. In the embodiment illustrated in FIG. 13, forwarding action 1311B is depicted as an "Allow" operation and forwarding action 1312B is depicted as a "Deny" operation, which are typically implemented by an ACL. Forwarding actions 1321B, 1322B, and 1323B are depicted as routing operations.

In operation, an input packet set PS A is first processed by first processing state 1310, resulting in the generation of output packet sets PS A-11 and PS A-12. Input packet set PS A is represented by a PCDD 1301, output packet set PS A-11 is represented by a PCDD 1302, and output packet set PS A-12 is represented by a PCDD 1303. Further, the intersection of PCDD 1301 with PCDD 1311A corresponds to output packet set PS A-11 and the intersection of PCDD 1301 with PCDD 1312A corresponds to output packet set PS A-12. Thus, output packet set PS A-11 is a subset of packet set PS A and output packet set PS A-12 is a subset of packet set PS A. As shown, output packet set PS A-11 undergoes forwarding action 1311B and output packet set PS A-12 undergoes forwarding action 1312B. In the embodiment illustrated in FIG. 13, forwarding action 1312B is depicted as a Deny operation and, as a result, packet set PS A-12 includes the set of packets that is dropped by the network device modeled by first processing state 1310. Forwarding action 1311B is depicted as an Allow operation. Thus, packet set PS A-11 includes the set of packets that is allowed by the network device modeled by first processing state 1310, and, as a result, packet set PS A-11 proceeds to second processing stage 1320.

Output packet set PS A-11 is then processed as an input packet set for second processing state 1320. When packet set PS A-11 is processed by second processing stage 1320, the set of packets included in packet set PS A-11 is intersected with PCDD 1321A, PCDD 1322A, and PCDD 1323A. As a result, the intersection of packet set PS A-11 with PCDD 1321A generates packet set PS A-11-21, the intersection of packet set PS A-11 with PCDD 1322A generates packet set PS A-11-22, and the intersection of packet set PS A-11 with PCDD 1323A generates packet set PS A-11-23. As shown, forwarding action 1321B is performed on packet set PS A-11-21, forwarding action 1322B is performed on packet set PS A-11-22, and forwarding action 1323B is performed on packet set PS A-11-23. As the verification process continues, further processing is performed on output packet sets PS A-11-21, PS A-11-21, and PS A-11-23 at subsequent processing stages of the modeled network.

Portion 1300 can be performed throughout a verification process of a modeled network. For example, a set intersection operation between a packet set and the various equivalence classes at the starting point in the network is first performed. If the intersection is non-empty, the network forwarding action associated with the equivalence class on this intersection is then performed. This action results in a packet set reaching a different location in the network, where the process is repeated.

Figure 14:
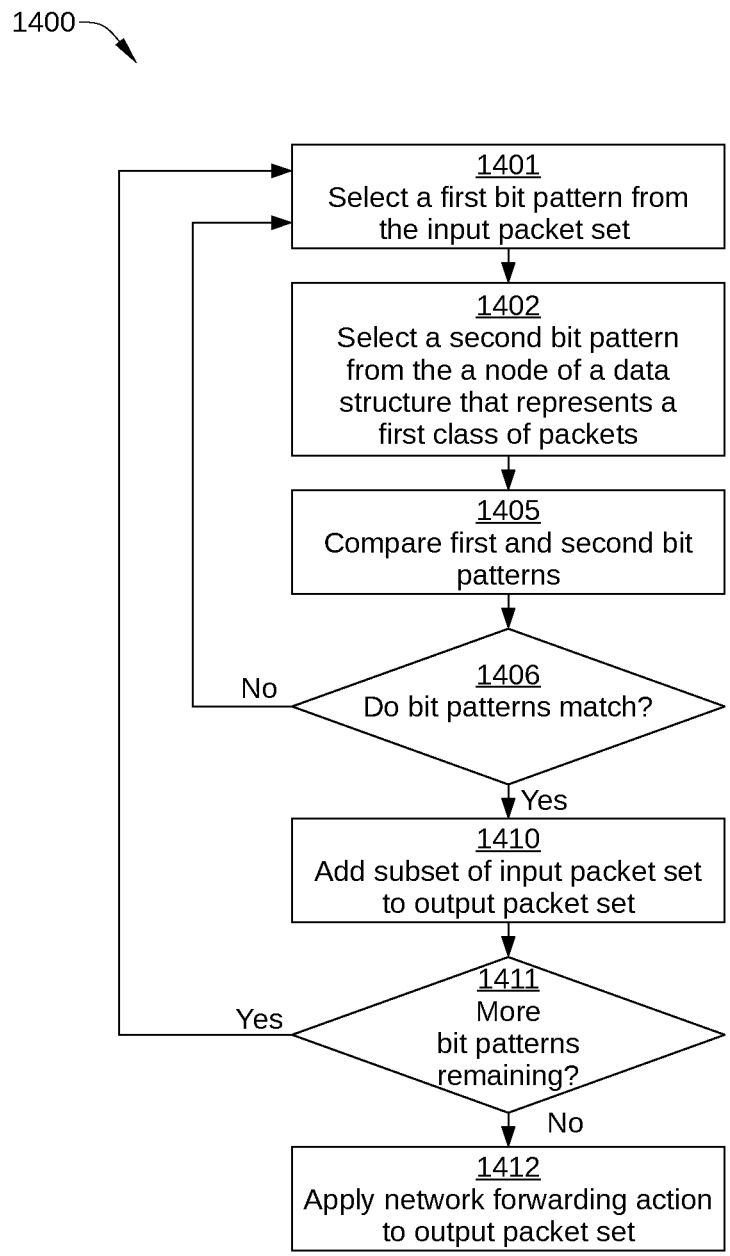
FIG. 14 sets forth a flowchart of method steps for determining a flow path for a packet set through a network device, according to an embodiment.

FIG. 14 sets forth a flowchart of method steps for determining a flow path for a packet set through a network device, according to an embodiment. The method steps are performed for a specific instance of data communication network 102, for example via network modeler 105, and for a specific input packet set, such as a packet set that includes source and destination information within the data communication network being modeled. Although the method steps are described in conjunction with network verification system 100 of FIG. 1-13, persons skilled in the art will understand that the method steps may be performed with other types of systems.

A method 1400 begins at step 1401, where network modeler 105 selects a first bit pattern from the input packet set based on a bit location indicated by a decision node of a PCDD associated with the network device. For example, in an instance in which the selected decision node is decision node 1030, the bit location indicated is bit location 1032, which is bits 0-3 of the bit string representing the input packet set.

In step 1402, network modeler 105 selects a second bit pattern from the variable of the decision node. For example, in an instance in which the decision node is decision node 1030, the second bit pattern selected is bit pattern 1031 of the bit string representing the input packet set. The second bit pattern represents a class of packets. Specifically, the second bit pattern represents a class of packets that are included in the PCDD of the network device. In some instances, the second bit pattern alone represents the class of packets. In other instances, the second bit pattern represents the class of packets in combination with other bit patterns from other variables of other decision nodes of the PCDD associated with the network device.

In step 1403, network modeler 105 compares the first bit pattern selected in step 1401 to the second bit pattern selected in step 1402. In step 1404, network modeler 105 determines whether the first bit pattern matches the second bit pattern. If no, method 1400 returns to step 1401; if yes, method 1400 proceeds to step 1410.

In step 1410, network modeler 105 adds a subset of the input packet set to an output packet. The subset of the input packet set includes the set of packets in the input packet set that correspond to the class of packets represented by the second bit pattern. In some embodiments, when the subset of the input packet set is the first class of packets to be added to the output packet set, network modeler 105 first generates the output packet set. In such embodiments, the output packet set can be represented by a specific PCDD that is generated by network modeler 105. In step 1411, network modeler 105 determines whether more bit patterns of the input packet set remain to be compared to bit patterns of the PCDD associated with the network device. If no, method 1400 proceeds to step 1412; if yes, method 1400 returns to step 1401 and the above process continues for the input packet set.

In step 1412, network modeler 105 applies the network forwarding action associated with the PCDD of the network device to the output packet set.

In general, method 1400 can be performed for a processing stage of a network device that is included in a network model.

Packet Set Indexing

One of the interesting operations for symbolic dataplane analysis is the ability to check whether a packet set overlaps with a collection of other packet sets. For example, when a collection of n equivalence classes (say $C_1, C_2 \ldots C_n$) exist at a particular table, and we are interested in finding out how a packet set Q is processed by the table, we would compute which among those n sets have a non-empty intersection with Q, and for each such non-empty intersection, perform the action associated with the equivalence class on the intersection. A naïve algorithm to do this would be to individually check pairwise overlap of the set (Q in our example) with each of sets in the collection ($C_1, C_2 \ldots C_n$) in our example).

According to some embodiments, to optimize an operation to check for packet set overlap, packet set indexes are employed. A packet set index allows the following operations: 1) Inserting a packet set into the index; 2) (Optional) Removing a packet set from the index; and 3) Given a query packet set q, determine which of the packet sets in the index have a non-empty intersection (in other words which have an overlap) with q.

How the index structure performs such indexing can be tied to the data structure used for representing the packet sets that are inserted and queried. In some embodiments, for PCDD, an index is employed that is called the APC Index. The APC index can be a ternary tree (note—not a decision diagram like a PCDD, but a true tree). Similar to a PCDD, an APC index consists of terminal and non-terminal nodes. Terminal nodes are not particularly special—they are simply nodes which are designated as such and have no children. Non-terminal nodes are decision nodes which have three edges corresponding to three different outcomes of the decision—a yes edge, a no edge and an optional edge indicating that the outcome is irrelevant (wild card). The decision made at each non-terminal node is similar to a PCDD node—whether there is a match on a bit pattern or not. Naturally, the path that leads from the root of the tree to any node (either terminal or non-terminal) represents a series of decisions made, and hence an overall pattern of bits. Recall that each set represented by a PCDD also has similar paths, and among those paths, those that lead to the True leaf represent bit patterns that are present in the set. For each PCDD set (for example S) that has been inserted into the index, for each path leading from the root of S to the constant True node, a path is present in the APC index. Such a path starts from the root and makes a sequence of pattern matches, which together matches the path in S. At the node where the bit pattern is fully matched, a pointer to S is stored, in a so-called "results" section of the node.

Figure 15:
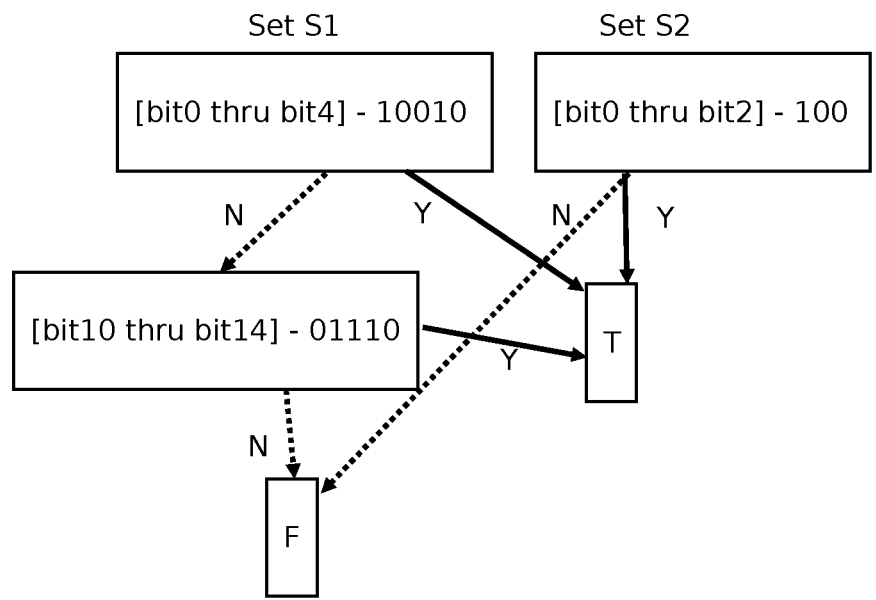
FIG. 15 illustrates two prefix-compressed decision diagram sets, according to various embodiments.
Figure 16:
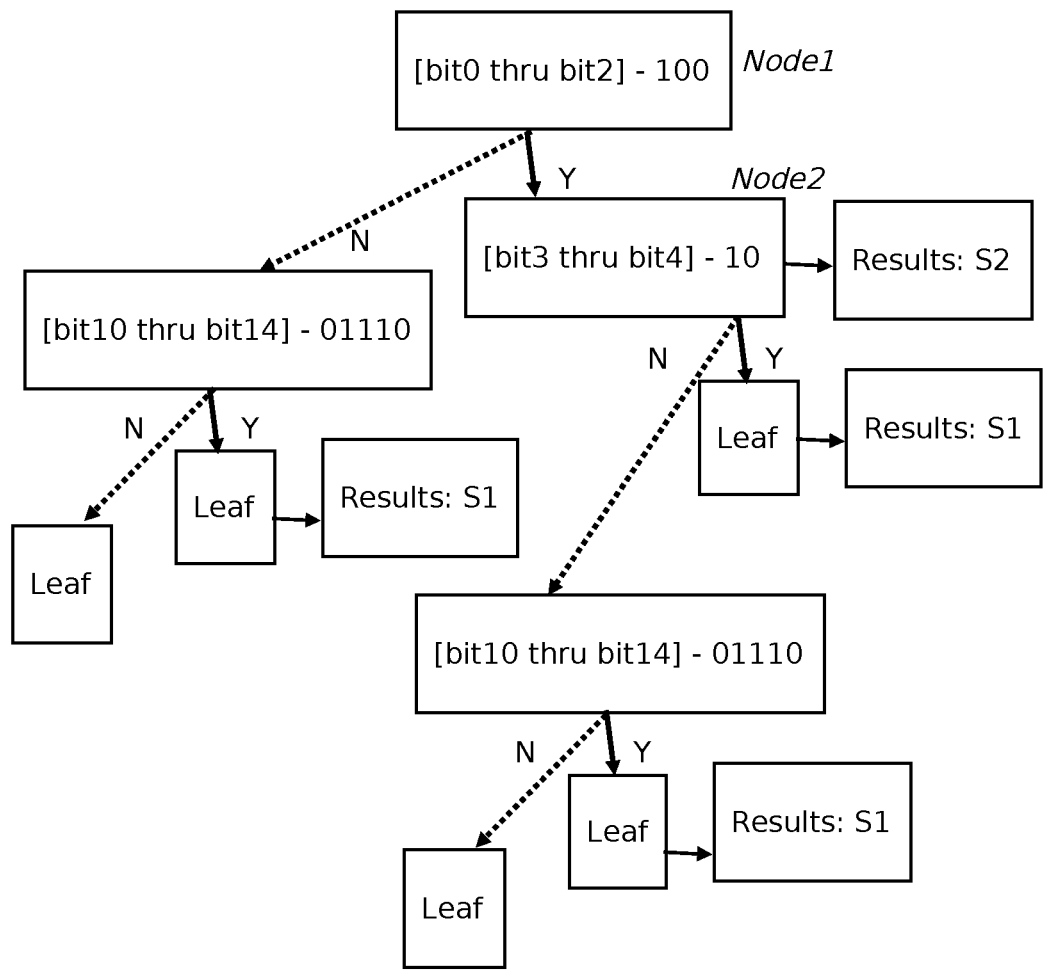
FIG. 16 illustrates an APC index, according to various embodiments.

FIG. 15 illustrates two PCDD sets S1 and S2, according to various embodiments. FIG. 16 illustrates an APC index, according to various embodiments. The APC index of FIG. 16 is the APC index containing both S1 and S2. In the index, reaching Node2 represents entirely matching the bit pattern described in S2, so there is a results section in Node2, pointing to S2. S1 is similarly stored at the end of each bit pattern that is present in S1.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

We claim:

1. A method of packet forwarding for a packet set in a network device, the method comprising:
    selecting a first bit pattern of multiple adjacent bits from a bit string that represents an input packet set;
    selecting a second bit pattern of multiple adjacent bits from a first node of a data structure that implements a prefix-compressed decision diagram having packet set information of a first class of packets, the first class of packets comprising an equivalence class associated with a network forwarding action;
    performing a comparison of the first bit pattern to the second bit pattern;
    generating an output packet set, which is a subset of the input packet set, in response to the first bit pattern matching the second bit pattern; and
    applying the network forwarding action to the output packet set, the network forwarding action dictating packet forwarding behavior of the network device with respect to the output packet set.

2. The method of claim 1, wherein selecting the first bit pattern of multiple adjacent bits from the bit string comprises selecting the first bit pattern from a bit location indicated by the first node of the data structure.

3. The method of claim 1, wherein selecting the second bit pattern comprises selecting the second bit pattern from a variable associated with the first node.

4. The method of claim 1, wherein the equivalence class includes a set of packets associated with at least one packet-forwarding rule associated with the network device.

5. The method of claim 1, wherein the network forwarding action is performed by the network device.

6. The method of claim 1, further comprising selecting the first node of the data structure based on a comparison of a third bit pattern to a fourth bit pattern, wherein the third bit pattern is a bit pattern of multiple adjacent bits from the bit string that represents the input packet set and the fourth bit pattern is a bit pattern of multiple adjacent bits from a second node of the data structure.

7. The method of claim 6, wherein the second node is a parent node of the first node.

8. The method of claim 7, wherein selecting the first node comprises determining a child node of the second node based on a pointer value of the second node.

9. A non-transitory computer readable medium storing instructions that are executable on a processor, wherein the instructions, when executed by the processor, cause the processor to perform the steps of:
    selecting a first bit pattern of multiple adjacent bits from a bit string that represents an input packet set;
    selecting a second bit pattern of multiple adjacent bits from a first node of a data structure that implements a prefix-compressed decision diagram having packet set information of a first class of packets, the first class of packets comprising an equivalence class associated with a network forwarding action;
    performing a comparison of the first bit pattern to the second bit pattern;
    generating an output packet set, which is a subset of the input packet set, in response to the first bit pattern matching the second bit pattern; and
    applying a network forwarding action to the output packet set, the network forwarding action dictating packet forwarding behavior of the network device with respect to the output packet set.

10. The non-transitory computer readable medium of claim 9, wherein
    selecting the first bit pattern of multiple adjacent bits from the bit string comprises selecting the first bit pattern from a bit location indicated by the first node of the data structure.

11. The non-transitory computer readable medium of claim 9, wherein
    selecting the second bit pattern comprises selecting the second bit pattern from a variable associated with the first node.

12. The non-transitory computer readable medium of claim 9, wherein the equivalence class includes a set of packets associated with at least one packet-forwarding rule associated with the network device.

13. The non-transitory computer readable medium of claim 9, wherein the network forwarding action is performed by the network device.

14. The non-transitory computer readable medium of claim 9, further storing instructions that, when executed by the processor, cause the processor to perform the step of selecting the first node of the data structure based on a comparison of a third bit pattern to a fourth bit pattern, wherein the third bit pattern is a bit pattern of multiple adjacent bits from the bit string that represents the input packet set and the fourth bit pattern is a bit pattern of multiple adjacent bits from a second node of the data structure.

* * * * *